US009443147B2

(12) United States Patent
Mei et al.

(10) Patent No.: US 9,443,147 B2
(45) Date of Patent: Sep. 13, 2016

(54) ENRICHING ONLINE VIDEOS BY CONTENT DETECTION, SEARCHING, AND INFORMATION AGGREGATION

(75) Inventors: Tao Mei, Beijing (CN); Xian-Sheng Hua, Beijing (CN); Shipeng Li, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 324 days.

(21) Appl. No.: 12/767,114

(22) Filed: Apr. 26, 2010

(65) Prior Publication Data

US 2011/0264700 A1 Oct. 27, 2011

(51) Int. Cl.
*G06K 9/00* (2006.01)
*H04N 21/462* (2011.01)
*H04N 21/4722* (2011.01)
(Continued)

(52) U.S. Cl.
CPC ..... *G06K 9/00765* (2013.01); *G06F 17/30017* (2013.01); *G06K 9/00751* (2013.01); *G06Q 30/02* (2013.01); *H04N 21/4622* (2013.01); *H04N 21/4722* (2013.01)

(58) Field of Classification Search
CPC ............. G06K 9/00765; G06K 9/00751; H04N 21/4622; H04N 21/4722; G06F 17/30017; G06Q 30/02
USPC ............ 707/780, 772, 914, E17.02, 999.107
See application file for complete search history.

(56) References Cited

U.S. PATENT DOCUMENTS 5,600,366 A * 2/1997 Schulman ............... H04N 7/165
348/E7.063
5,873,080 A * 2/1999 Coden et al.
(Continued)

FOREIGN PATENT DOCUMENTS

CN 1663263 A 8/2005
CN 101021855 A 8/2007
(Continued)

OTHER PUBLICATIONS

"International Search Report", Mailed Date: Dec. 20, 2011, Application No. PCT/US2011/031046, Filed Date: Apr. 4, 2011, pp. 9.
(Continued)

*Primary Examiner* — Phuong Thao Cao
(74) *Attorney, Agent, or Firm* — Sandy Swain; Micky Minhas; Lee & Hayes, PLLC

(57) ABSTRACT

Many internet users consume content through online videos. For example, users may view movies, television shows, music videos, and/or homemade videos. It may be advantageous to provide additional information to users consuming the online videos. Unfortunately, many current techniques may be unable to provide additional information relevant to the online videos from outside sources. Accordingly, one or more systems and/or techniques for determining a set of additional information relevant to an online video are disclosed herein. In particular, visual, textual, audio, and/or other features may be extracted from an online video (e.g., original content of the online video and/or embedded advertisements). Using the extracted features, additional information (e.g., images, advertisements, etc.) may be determined based upon matching the extracted features with content of a database. The additional information may be presented to a user consuming the online video.

17 Claims, 11 Drawing Sheets

(51) Int. Cl.
*G06F 17/30* (2006.01)
*G06Q 30/02* (2012.01)

(56) References Cited

U.S. PATENT DOCUMENTS

| | | | |
|---|---|---|---|
| 6,175,829 B1* | 1/2001 | Li | G06F 17/30247 |
| 6,363,380 B1* | 3/2002 | Dimitrova | 707/740 |
| 6,571,054 B1* | 5/2003 | Tonomura et al. | 386/241 |
| 6,704,930 B1* | 3/2004 | Eldering | H04N 5/44543 348/385.1 |
| 7,136,875 B2* | 11/2006 | Anderson | G06Q 30/02 |
| 7,356,830 B1* | 4/2008 | Dimitrova | G06F 17/30787 375/E7.001 |
| 7,421,455 B2* | 9/2008 | Hua et al. | |
| 7,565,016 B2 | 7/2009 | Hua et al. | |
| 7,793,326 B2* | 9/2010 | McCoskey et al. | 725/91 |
| 8,010,988 B2* | 8/2011 | Cox | 725/110 |
| 8,122,472 B2* | 2/2012 | Krieger et al. | 725/53 |
| 8,140,965 B2* | 3/2012 | Dean | G06F 17/30864 715/234 |
| 8,156,001 B1* | 4/2012 | Jing et al. | 705/14.4 |
| 8,214,387 B2* | 7/2012 | King | H04N 1/00244 235/375 |
| 8,549,556 B2* | 10/2013 | Rakib et al. | 725/34 |
| 8,570,376 B1* | 10/2013 | Sharma | H04N 7/18 348/159 |
| 8,588,583 B2* | 11/2013 | Goldman | 386/241 |
| 8,898,713 B1* | 11/2014 | Price | H04N 21/25891 725/21 |
| 2001/0004739 A1 | 6/2001 | Sekiguchi et al. | |
| 2002/0026353 A1 | 2/2002 | Porat et al. | |
| 2002/0051077 A1* | 5/2002 | Liou et al. | 348/465 |
| 2002/0087661 A1* | 7/2002 | Matichuk | B60P 3/34 709/218 |
| 2002/0163532 A1* | 11/2002 | Thomas et al. | 345/723 |
| 2003/0117428 A1* | 6/2003 | Li et al. | 345/716 |
| 2003/0167449 A1* | 9/2003 | Warren et al. | 715/531 |
| 2003/0208756 A1 | 11/2003 | Macrae et al. | |
| 2003/0212996 A1* | 11/2003 | Wolzien | G01C 21/28 725/60 |
| 2004/0008789 A1* | 1/2004 | Divakaran | G06F 17/30843 375/240.26 |
| 2005/0038814 A1* | 2/2005 | Iyengar | G06F 17/30038 |
| 2005/0180730 A1* | 8/2005 | Huh et al. | 386/52 |
| 2005/0228849 A1* | 10/2005 | Zhang | G06F 17/30787 709/200 |
| 2005/0267820 A1 | 12/2005 | Zheng | |
| 2006/0020597 A1* | 1/2006 | Keating et al. | 707/6 |
| 2006/0026628 A1 | 2/2006 | Wan et al. | |
| 2006/0177114 A1* | 8/2006 | Tongdee et al. | 382/128 |
| 2006/0206526 A1* | 9/2006 | Sitomer | 707/104.1 |
| 2007/0201558 A1* | 8/2007 | Xu | G06K 9/6218 375/240.22 |
| 2007/0250901 A1* | 10/2007 | McIntire | H04N 7/17318 725/146 |
| 2007/0255755 A1* | 11/2007 | Zhang et al. | 707/104.1 |
| 2008/0065580 A1* | 3/2008 | Spence et al. | 706/62 |
| 2008/0109851 A1 | 5/2008 | Heather et al. | |
| 2008/0112625 A1* | 5/2008 | Cooper | 382/228 |
| 2008/0127250 A1 | 5/2008 | DaCosta | |
| 2008/0159383 A1* | 7/2008 | Kukreja et al. | 375/240.01 |
| 2008/0178242 A1* | 7/2008 | Eyal et al. | 725/115 |
| 2008/0201361 A1* | 8/2008 | Castro et al. | 707/103 R |
| 2008/0270344 A1* | 10/2008 | Yurick | G06F 17/30026 |
| 2008/0313697 A1* | 12/2008 | Rajan | H04H 20/18 725/151 |
| 2009/0006368 A1* | 1/2009 | Mei | G06F 17/30796 |
| 2009/0079871 A1 | 3/2009 | Hua et al. | |
| 2009/0087122 A1* | 4/2009 | Xu | G06F 17/30843 382/277 |
| 2009/0094113 A1* | 4/2009 | Berry | G06F 17/30017 705/14.73 |
| 2009/0150784 A1* | 6/2009 | Denney et al. | 715/722 |
| 2009/0285551 A1* | 11/2009 | Berry | G06K 9/00711 386/249 |
| 2009/0299999 A1* | 12/2009 | Loui | G06F 17/30256 |
| 2010/0023966 A1* | 1/2010 | Shahraray | H04N 5/44543 725/34 |
| 2010/0030642 A1 | 2/2010 | Huffman et al. | |
| 2010/0037250 A1* | 2/2010 | Lawrence, III | 725/14 |
| 2010/0058182 A1* | 3/2010 | Jung | G06F 3/04883 715/702 |
| 2010/0067865 A1* | 3/2010 | Saxena | G06T 7/2033 386/278 |
| 2010/0070523 A1* | 3/2010 | Delgo et al. | 707/769 |
| 2010/0077289 A1* | 3/2010 | Das et al. | 715/230 |
| 2010/0077435 A1* | 3/2010 | Kandekar et al. | 725/61 |
| 2010/0104261 A1* | 4/2010 | Liu et al. | 386/95 |
| 2010/0145971 A1* | 6/2010 | Cheng et al. | 707/759 |
| 2010/0223113 A1* | 9/2010 | Lee | G06Q 30/0241 705/14.4 |
| 2010/0223132 A1* | 9/2010 | Lee | G06Q 30/0255 705/14.53 |
| 2010/0312608 A1* | 12/2010 | Shan | G06F 17/30867 705/14.54 |
| 2010/0329563 A1* | 12/2010 | Luo | G06K 9/00765 382/190 |
| 2011/0055266 A1* | 3/2011 | Varadarajan et al. | 707/780 |
| 2011/0085728 A1* | 4/2011 | Gao et al. | 382/165 |
| 2011/0087553 A1* | 4/2011 | Mishra | G06Q 30/02 705/14.73 |
| 2011/0179452 A1* | 7/2011 | Dunker et al. | 725/53 |
| 2011/0208587 A1* | 8/2011 | Grewal et al. | 705/14.55 |
| 2011/0252065 A1* | 10/2011 | Ryu | G06F 17/30038 707/794 |
| 2011/0264700 A1* | 10/2011 | Mei | G06K 9/00765 707/780 |

FOREIGN PATENT DOCUMENTS

| | | |
|---|---|---|
| CN | 101076991 A | 11/2007 |
| CN | 101616264 | 12/2009 |
| JP | 2001337984 A | 12/2001 |
| JP | 2003283968 A | 10/2003 |
| JP | 2003330935 A | 11/2003 |
| JP | 2008146490 A | 6/2008 |
| JP | 2008269628 A | 11/2008 |
| JP | 2009038481 A | 2/2009 |
| JP | 2009087106 A | 4/2009 |
| KR | 1020080069955 A | 7/2008 |
| WO | 2006028213 A1 | 3/2006 |

OTHER PUBLICATIONS

Lock, Andrew., "Marketing Tips: Embed Ads in Video", Retrieved at << http://www.smallbusinesscomputing.com/emarketing/article.php/3874661 >>, Apr. 5, 2010, pp. 3.

Wang, et al., "Linking video ads with product or service information by web search", Retrieved at << http://ieeexplore.ieee.org/stamp/stamp.jsp?tp=&arnumber=5202488 >>, Proceedings of the 2009 IEEE international conference on Multimedia and Expo, Jun. 28-Jul. 3, 2009, pp. 274-277.

Cheong, et al., "Consumers' Reliance on Product Information and Recommendations Found in UGC", Retrieved at << http://www.jiad.org/article103 >>, Journal of Interactive Advertising, vol. 8, No. 2, 2008, pp. 38-49.

Good, Robin., "Advertising Search Becomes a Reality: TiVo Product Watch", Retrieved at << http://www.masternewmedia.org/news/2006/05/09/advertising_search_becomes_a_reality.htm >>, May 9, 2006, pp. 15.

Hua, et al., "Robust Learning-Based TV Commercial Detection", Retrieved at << http://research.microsoft.com/en-us/um/people/xshua/publications/pdf/2005_icme_tvadd.pdf >>, IEEE International Conference on Multimedia and Expo (ICME 2005), Jul. 6-8, 2005, pp. 4.

Moxley, et al., "Automatic Video Annotation through Search and Mining", Retrieved at << http://www.emilymoxley.com/papers/moxley_icme08.pdf. >>, IEEE Conference on Multimedia & Expo (ICME), Jun. 23-26, 2008, pp. 4.

Chen, et al., "Text Area Detection from Video Frames", Retrieved at << http://citeseerx.ist.psu.edu/viewdoc/summary?doi=10.1.1.16.

(56) References Cited

OTHER PUBLICATIONS

176 >>, Lecture Notes in Computer Science, vol. 2195, Proceedings of the Second IEEE Pacific Rim Conference on Multimedia: Advances in Multimedia Information Processing, Oct. 24-26, 2001, pp. 1-7.
Lowe, David G., "Distinctive Image Features from Scale-Invariant Keypoints", Retrieved at << http://www.cs.ubc.ca/~lowe/papers/ijcv04.pdf >>, International Journal of Computer Vision, vol. 60, No. 2, Nov. 2004, pp. 1-28.
Zhang, et al., "Automatic Partitioning of Full-Motion Video", Institute of Systems Science, National University of Singapore, Heng Mui Keng Terrace, Kent Ridge, Singapore 0511, Republic of Singapore, Accepted Apr. 10, 1993.
"Scansoft Software", http://office.microsoft.com/en-us/help/HP010771031033.aspx; Retrieved Apr. 14, 2010, pp. 1-3.
Int. Preliminary Report cited in PCT Application No. PCT/US2011/031046 dated Oct. 30, 2012, 5 pgs.
First Chinese Office Action cited in Chinese Application No. 201180020853.6 dated Nov. 4, 2014, 14 pgs.
First Japanese Office Action cited in Japanese Application No. 2013-507976 dated Nov. 25, 2014, 11 pgs.
Reply Chinese Office Action cited in Chinese Application No. 201180020853.6 dated Mar. 19, 2015, 16 pgs.
Reply Japanese Office Action cited in Japanese Application No. 2013-507976 dated Mar. 13, 2015, 4 pgs.
Second Chinese Office Action cited in Chinese Application No. 201180020853.6 dated Jul. 13, 2015, 15 pgs.
Japanese NOA/Allowed Claims cited in Japanese Application No. 2013-507976 dated Jun. 29, 2015, 3 pgs.
Translated Chinese Office Action and Search Report mailed Feb. 1, 2016 for Chinese patent application No. 201180020853.6, a counterpart foreign application of U.S. Appl. No. 12/767,114, 15 pages.

\* cited by examiner

ENRICHING ONLINE VIDEOS BY CONTENT DETECTION, SEARCHING, AND INFORMATION AGGREGATION

BACKGROUND

When browsing the internet, users interact with a variety of content through online videos. For example, users may view full length movies, advertisements, home videos captured by cell phones, television shows, and other content. Not only may users view online videos through a host website, but may also upload and share online videos with other users. Because online videos play such as integral role in a user internet experience, additional information, such as advertisements and related services (e.g., news, weather, nearby traffic, etc.), may be incorporated with the online video to enhance the user's experience. Unfortunately, current techniques may provide additional information that is irrelevant to the original or embedded content of the online video. Thus, a user may often ignore irrelevant additional information because it may not appeal to the interest of the user.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for determining a set of additional information relevant to an online video are disclosed herein. It may be appreciated that a set of additional information may comprise any digital content or combination thereof, such as images, text, audio, video, etc. In one example, a set of additional information may be a video advertisement. In another example, a set of additional information may be a set of images coupled with a URL linking to a webpage.

In one embodiment, an online video may be received. It may be appreciated that the online video may comprise the original content and/or embedded content, such as overlaid advertisements. A set of features from the online video may be extracted. The set of features may comprise textual features (e.g., embedded text), visual features (e.g., textures, SIFT descriptors, etc.), audio features, and/or other descriptive data of the online video. A set of additional information may be determined based upon the set of features. For example, a multimodal relevance matching algorithm may be executed against a database (e.g., an advertisement database) using the set of features to determine the set of additional information. In one example, the set of additional information may be presented to a user consuming the online video. In another example, the set of additional information may be saved for later utilization.

In another embodiment, a parsing component may be configured to parse an online video into one or more segments, a segment comprising a sequence of frames of the online video. For respective segments, the parsing component may extract one or more keyframes representative of a sequence of frames of a segment. Because an entire segment may comprise unnecessary amounts of information, one or more keyframes are extracted to represent a segment. A feature extraction component may be configured to extract a set of feature from the one or more keyframes of respective segments. The set of features may comprise textual, visual, audio, and/or other features relating to the online video. An information extraction component may be configured to execute a multimodal relevance matching algorithm against a database using the set of features to determine the set of additional information. A presentation component may be configured to present the set of additional information. In one example, the set of additional information may be presented within a browser hosting the online video. In another example, the set of additional information may be presented overlaid the online video. In another example, the set of additional information may be presented within a skin of a media player hosting the online video. A variety of different presentation modes are contemplated as falling within the scope of the claimed subject matter.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
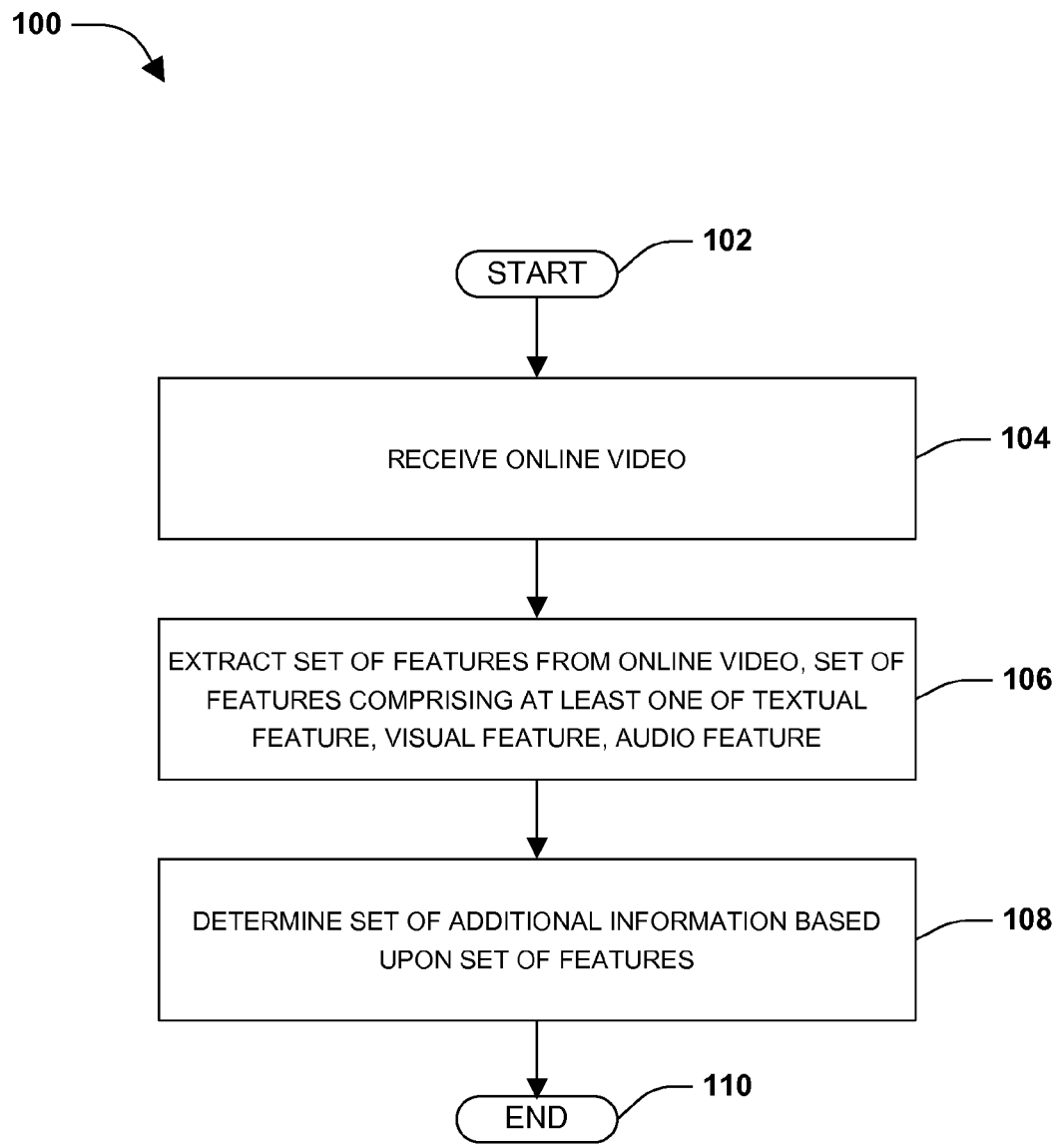
FIG. 1 is a flow chart illustrating an exemplary method of determining a set of additional information relevant to an online video.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Today, a substantial portion of internet content is in the form of online videos. For example, television programs may be streamed as online videos for users to consume. It may be advantageous to provide additional relevant information along with the online videos. For example, if a user is watching an online video comprising a promotional car video, then it may be useful to determine that the content of the online video relates to a car. Using the detected car feature, additional information (e.g., URL to car websites) relating to cars may be provided to the user to enhance their experience.

Unfortunately, current techniques may be unable to detect features of the online video and/or features of embedded content within the online video. Furthermore, current techniques may not use detected features of embedded content to search outside sources for additional information relevant to the embedded content. That is, current techniques may not search outside databases, such as an advertisement database, for additional information generated by sources other than the content producer of the online video and/or embedded content within the online video.

Accordingly, one or more systems and/or techniques for determining a set of additional information relevant to an online video are provided herein. In particular, features of an online video may be extracted from original content and/or embedded content (e.g., advertisements) of the online video. The features may be used as search criteria against a database, such as an advertisement database, to determine additional information relevant to the online video. It may be appreciated that the user may have an interest in the content of the online video because the user may choose to spend their browsing time watching the online video. In this way, a user's experience may be enhanced by providing the user with additional information relevant to the online video and/or the user's interest.

One embodiment of determining a set of additional information relevant to an online video is illustrated by an exemplary method 100 in FIG. 1. At 102, the method begins. At 104, an online video may be received. The online video may comprise original content and/or additional embedded content, such as overlaid advertisements. It may be appreciated that receiving the online video may be interoperated as gaining access to the content of the online video (e.g., accessing a real-time data stream of the online video while a user consumes the online video using a web browser or media player, accessing a stored copy of the online video, requesting the online video from a source hosting the online video, accessing the online video through a browser displaying the online video, etc.).

At 106, a set of features may be extracted from the online video. The set of features may comprise at least one of a textual feature, a visual feature, and/or an audio feature. In one example, a textual feature (e.g., superimposed text) may be extracted using one or more textual feature extraction techniques, such as an OCR text recognition technique. In another example, a visual feature (e.g., a color histogram, textures, SIFT descriptors) may be extracted by one or more visual feature extraction techniques, such as a scale-invariant feature transformation. It may be appreciated that in one example, more than one feature may be extracted as the set of features (e.g., two textual features as a set of features, one textual feature and two audio features as a set of features, one hundred visual textual and thirty textual features, etc.).

At 108, a set of additional information may be determined based upon the set of features. In one example, a multimodal relevance matching algorithm may be executed against a database using the set of features. In particular, the multimodal relevance matching algorithm may match features within the set of features with features of additional information, such as advertisements, images, videos, etc., within the database. For example, the set of features may comprise a visual feature of a car and a textual feature of the word "tires". The multimodal relevance matching algorithm may attempt to match the visual car feature and/or the textual tire feature with images, videos, web page URLs, and/or other content relating to cars and/or tires. The set of additional information relevant to the online video may be determined based upon the matched content. The set of additional information may be presented on a display. For example, the set of additional information may be presented as a video overlaid on or embedded within the online video. At 110, the method ends.

Figure 2:
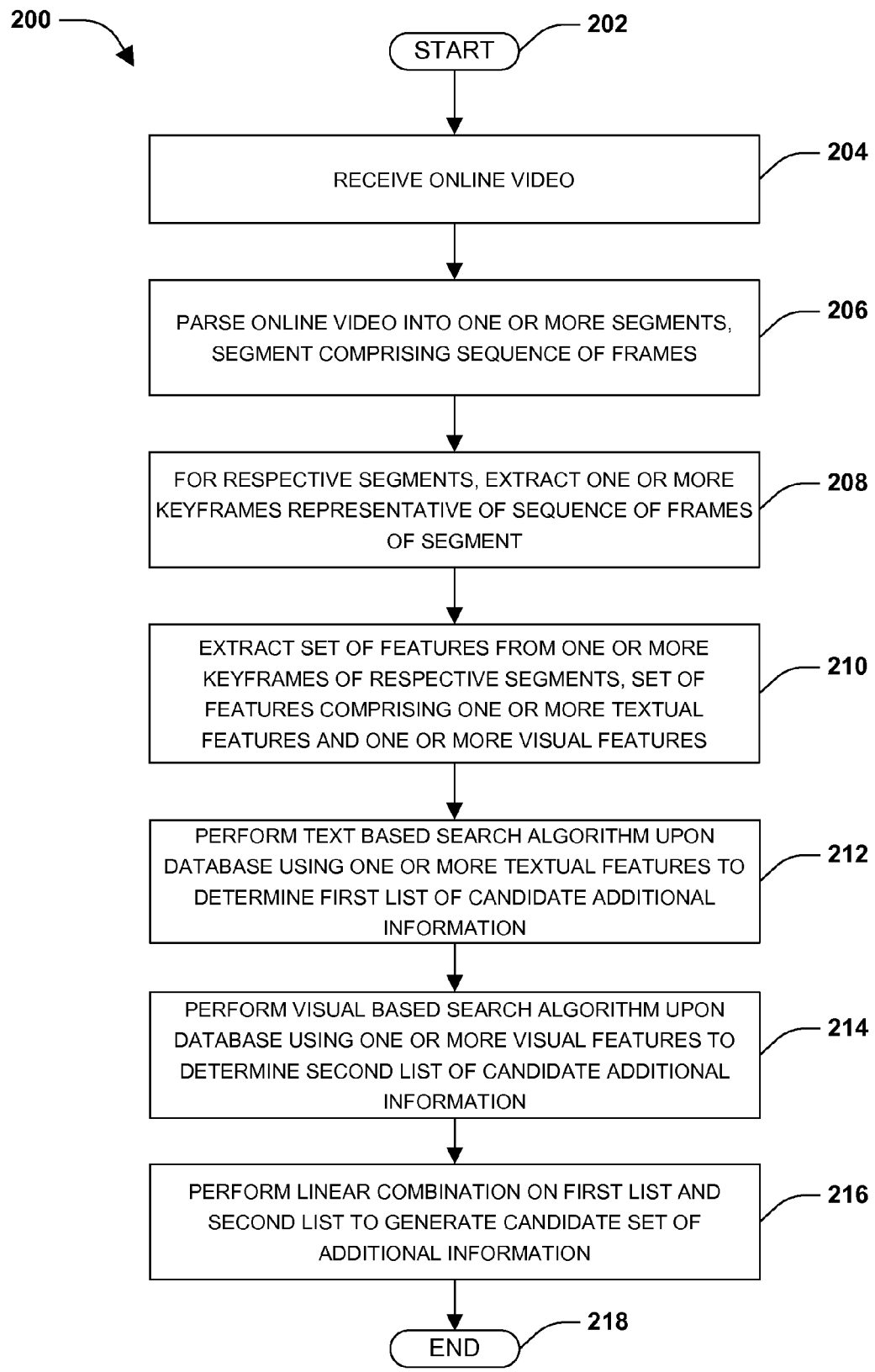
FIG. 2 is a component block diagram illustrating an exemplary system for determining a set of additional information relevant to an online video.

One embodiment of determining a set of additional information relevant to an online video is illustrated by an exemplary method 200 in FIG. 2. At 202, the method begins. At 204, an online video may be received. At 206, the online video may be parsed into one or more segments, a segment comprising a sequence of frames. The online video may be segmented to parse down the online video into manageable segments from which features may be identified and extracted. To aid in segmentation, boundaries may be determined based upon large visual differences between two sequential frames. Furthermore, segments may be designated as promotional content (e.g., embedded promotional content) or program content (e.g., original content of the online video), for example.

To further narrow the amount of information utilized from the online video, one or more keyframes may be extracted for respective segments, at 208. A keyframe may be a frame within a segment that is representative of a sequence of frames of the segment. For example, a middle frame or a frame having a video quality above a predetermined threshold may be selected as the keyframe. Selecting keyframes reduces the amount of unnecessary and/or redundant data utilized from the online video.

At 210, a set of features may be extracted from one or more keyframes of respective segments. In one example, a set of features may comprise one or more textual features and/or one or more visual features. At 212, a text based search algorithm may be performed upon a database using the one or more textual features to determine a first list of candidate additional information. For example, textual features may be used as keywords to search the database for content comprising matching keywords. At 214, a visual based search algorithm may be performed upon the database using one or more visual features to determine a second list of candidate additional information. For example, the visual features may be matched against content within the database comprising matching visual features.

At 216, a linear combination may be performed on the first list and second list to generate a candidate set of additional information. For example, the candidate set of additional information may comprise images, URLs, videos, advertisements, and/or other content matching features of the online video. It may be appreciated that the candidate set of additional information or portion thereof may be used as a set of additional information. In one example, the candidate set of additional information may be used as the set of additional information. In another example, a predetermined number of candidates may be selected from within the candidate set of additional information to generate the set of additional information. A predetermined number of candidate content may be selected because the candidate set of additional information may comprise an enormous amount of content that may be used as additional information. That is, the candidate set of additional information may comprise a combination of advertisement videos spanning a time frame longer than the online video. In one example, one or more candidates having high relevancy to the online video may be selected. The set of additional information may be aggregated into a video, which may be presented to a user engaged with the online video. At 218, the method ends.

Figure 3:
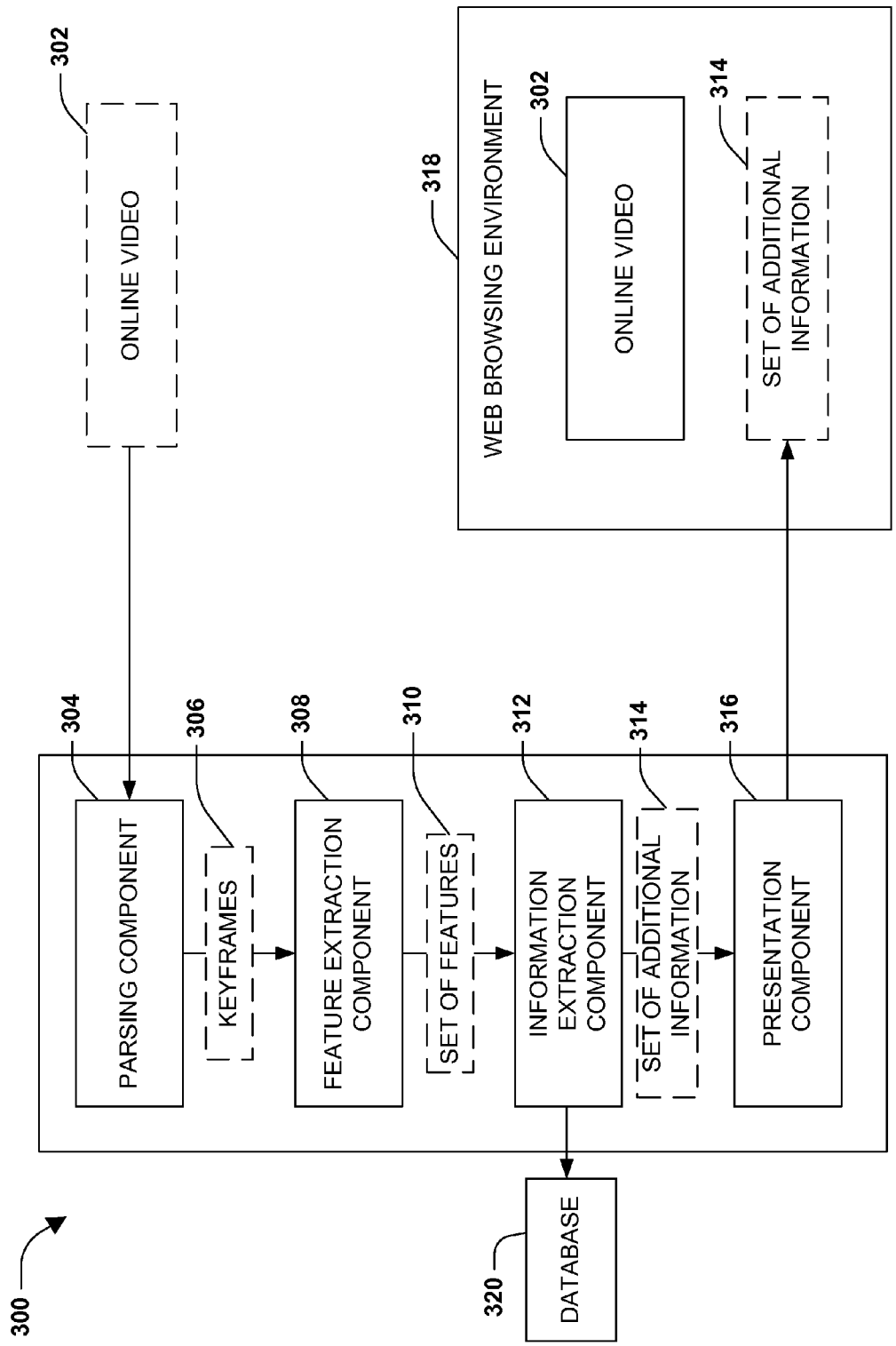
FIG. 3 is a component block diagram illustrating an exemplary system for determining a set of additional information relevant to an online video.

FIG. 3 illustrates an example of a system 300 configured for determining a set of additional information 314 relevant to an online video 302. The system 300 may comprise a parsing component 304, a feature extraction component 308, an information extraction component 312, and/or a presentation component 316. The system 300 may utilize a database 320. The database 320 may comprise digital content (potential candidates for additional information) in a format such as text, URLs, images, videos, audio, and/or other digital formats (e.g., advertisement videos, promotional images or text, URLs linking to web pages, coupon data, customer opinions, non-promotional content, etc.).

The parsing component 304 may be configured to parse the online video 302 into one or more segments, a segment comprising a sequence of frames of the online video 302. The parsing component 304 may be configured to extract keyframes 306 from the one or more segments. In particular, the parsing component 304 may extract one or more keyframes representative of a sequence of frames of a segment.

The feature extraction component 308 may be configured to extract a set of features 310 from the keyframes 306. The set of features 310 may comprise at least one of a textual feature, a visual feature, and/or an audio feature. In one example, the feature extraction component 308 may comprise a text recognition component, a visual recognition component, and/or an audio recognition component. The text recognition component may be configured to extract one or more textual features using an OCR text recognition technique and/or other textual recognition techniques. The visual recognition component may be configured to extract one or more visual features using a scale-invariant feature transformation and/or other visual recognition techniques. The audio recognition component may be configured to extract one or more audio features using one or more audio recognition techniques. A variety of different visual, textual, and audio recognitions techniques are contemplated as falling within the scope of the claimed subject matter.

The information extraction component 312 may be configured to execute a multimodal relevance matching algorithm against the database 320 using the set of features 310 to determine the set of additional information 314. In one example, the multimodal relevance matching algorithm may be configured to perform a text based search algorithm upon the database 320 using textual features to determine a first list of candidate additional information. The multimodal relevance matching algorithm may be configured to perform a visual based search algorithm upon the database 320 using visual features to determine a second list of candidate additional information. The multimodal relevance matching algorithm may perform a linear combination of the first list and second list to generate the set of additional information 314. The information extraction component 312 may be configured to aggregate the set of additional information 314 into a video.

In one example, the presentation component 316 may be configured to present the set of additional information 314. In another example, the presentation component 316 may be configured to present the video to a user consuming the online video 302 within a web browsing environment 318.

Figure 4:
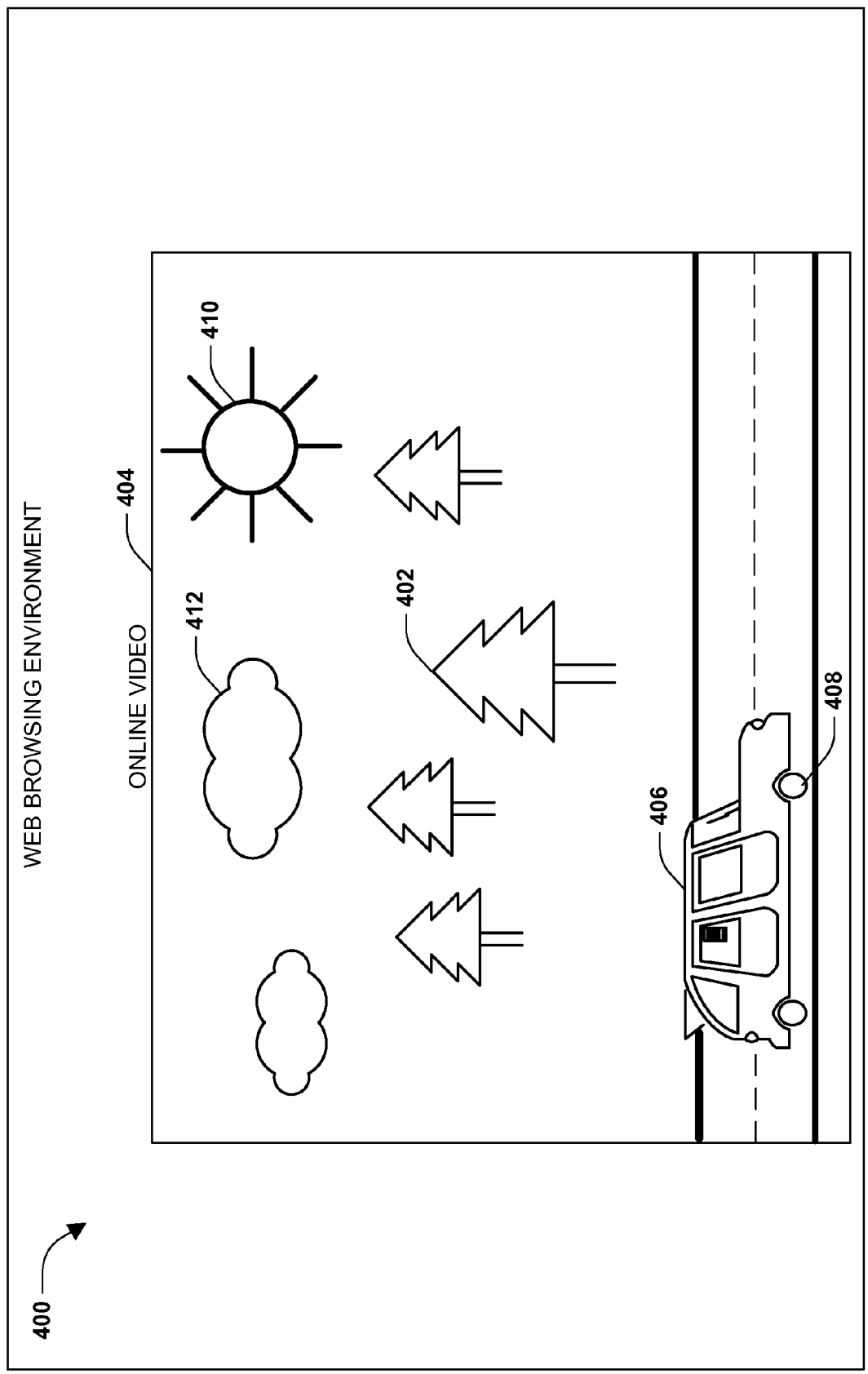
FIG. 4 is an illustration of an example of detecting visual features of an online video hosted within a web browsing environment.

FIG. 4 illustrates an example 400 of detecting visual features of an online video 404 hosted within a web browsing environment. It may be appreciated that the online video 404 may be hosted within a web page displayed by a web browser, a media player plug-in of a web browser, a media player separate from a web browser, and/or other online video playing devices. Visual features may be detected within the online video 404 and/or extracted as part of a set of features. For example, clouds 412, sun 410, trees 402, car 406, tires 408, and/or other visual features may be detected and/or extracted. Additional information relating to the extracted visual features may be determined and/or presented to a user consuming the online video 404. In one example, additional information regarding vacations may be presented based upon the sun 410, the clouds 412, and/or trees 402. In another example, additional information regarding car reviews may be presented based upon the car 406 and/or the tires 408. In this way, the user's experience may be enhanced because additional relevant information, which the user may have an interest in, may be presented to the user.

Figure 5:
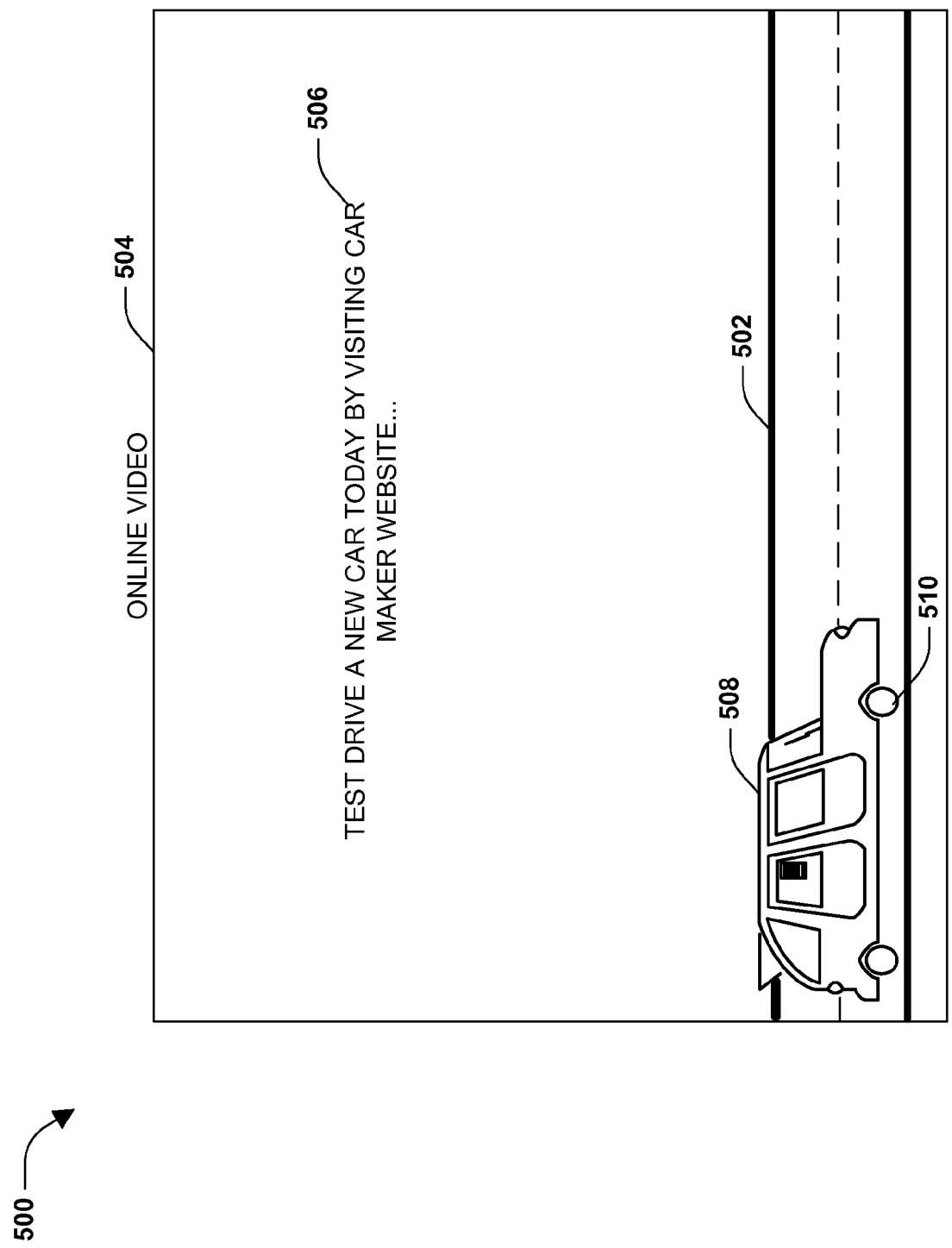
FIG. 5 is an illustration of an example of detecting visual features and/or textual features of an online video.

FIG. 5 illustrates an example 500 of detecting visual features and/or textual features of an online video 504. Visual features may be detected within the online video 504 and/or extracted as part of a set of features. For example, car 508, tires 510, and/or road 502 may be detected and/or extracted. Textual features may be detected within the online video 504 and/or extracted as part of the set of features. For example, the embedded text 506 "Test drive a new car today by visiting car maker website . . . " or a portion thereof may be detected and/or extracted. It may be appreciated that letters, single words, phrases, sentences, and/or other logical groupings of words may be detected as a textual feature. That is, the embedded text 506 may be parsed into one or more features (e.g., test drive, Car Maker, etc.). Using the visual features and/or textual features, additional information may be presented to a user consuming the online video 504. For example, additional information of a URL to a website hosted by the Car Maker may be presented based upon the car 508 visual feature and/or the Car Maker textual feature.

Figure 6:
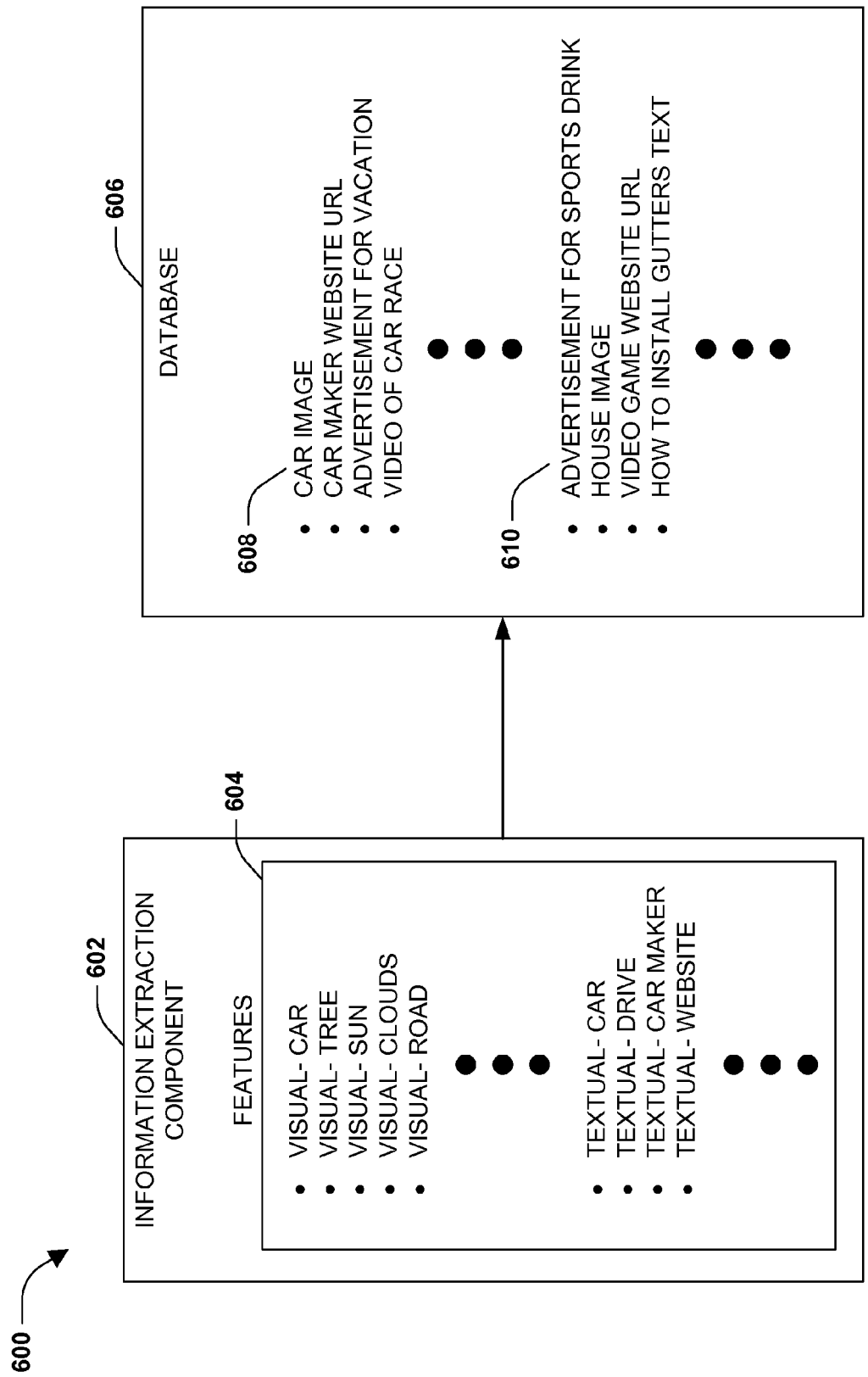
FIG. 6 is an illustration of an example of an information extraction component determining a set of additional information based upon a set of features extracted from an online video.

FIG. 6 illustrates an example 600 of an information extraction component 602 determining a set of additional information 608 based upon a set of features 604 extracted from an online video. In one example, the information extraction component 602 may have extracted visual features (car, tree, sun, clouds, road, etc.), textual features (car, drive, Car Maker, website, etc.), audio features (car engine noise, spoken words, etc.), and/or other features from the online video. The information extraction component 602 may determine the set of additional information 608 from within a database 606 using the set of features 604. It may be appreciated that the database 606 may comprise a vast array of content (e.g., images, URLs, advertisements, videos, audio, etc.) that may be determined as additional information.

It may be appreciated that some content within the database 606 (e.g., the set of additional information 608) may match one or more of the features within the set of features 604, while other content within the database 606 (e.g., irrelevant content 610) may not match features within the set of features 604. In this way, additional information relevant to the online video (e.g., content within the database 606 matching features within the set of features 604) may be determined within the database 606. For example, the set of additional information 608 may comprise a car image, a car maker website URL, an advertisement for vacation, a video of a car race, and/or other content matching the set of features 604. Irrelevant content 610 may be excluded from the set of additional information 608 because it does not relate to the set of features 604. For example, a textual description about how to install gutters may not match visual features of a car, tree, sun, clouds, road, etc. and/or textual features of a car, drive, Car Maker, website, etc.

Figure 7:
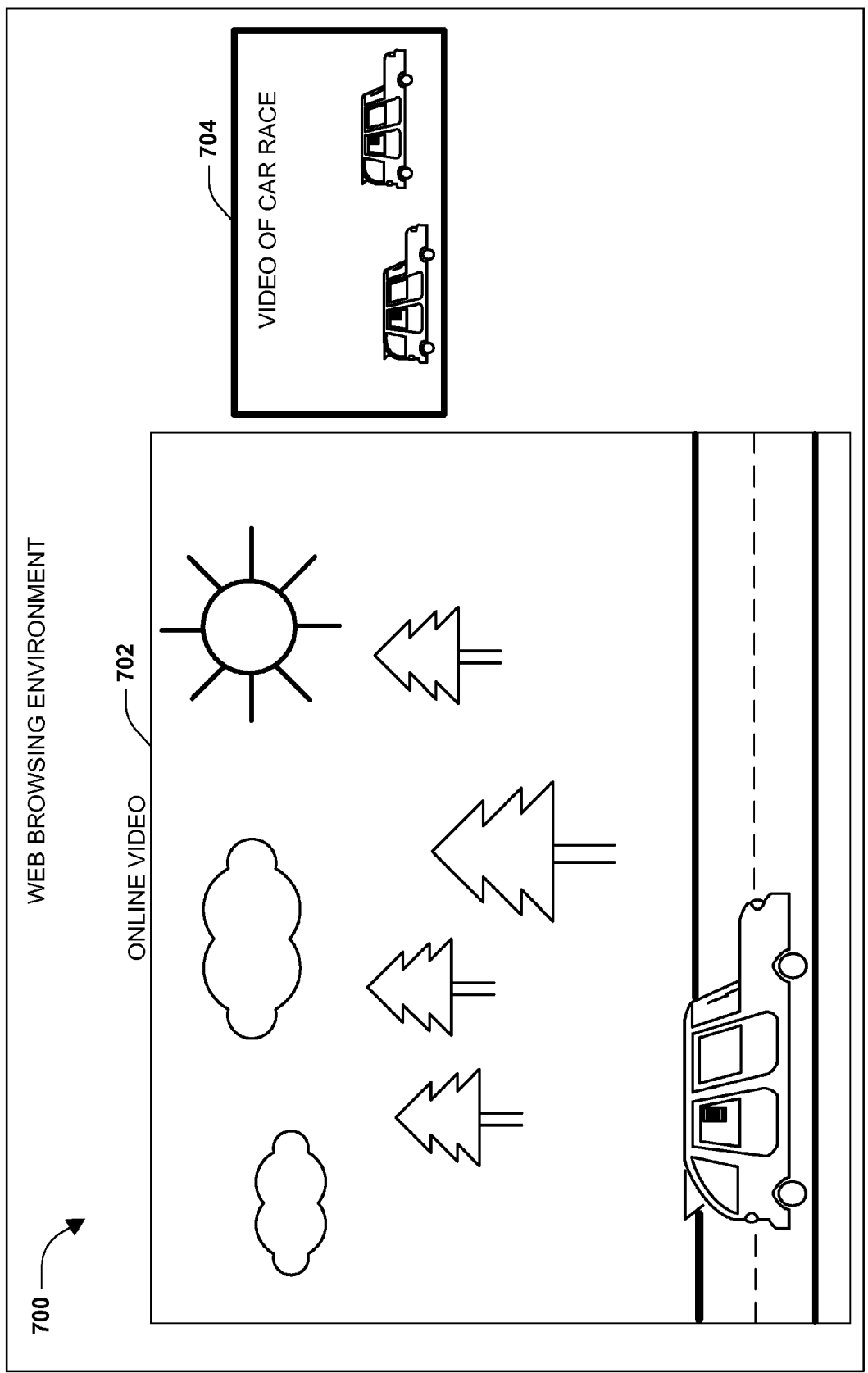
FIG. 7 is an illustration of an example of presenting additional information to a user consuming an online video.

FIG. 7 illustrates an example 700 of presenting additional information 704 to a user consuming an online video 702. In one example, a set of features relating to cars may have been extracted from the online video 702. Using the set of features relating to cars, the additional information 704 of a car race video may have been determined. In one example, the additional information 704 may be presented to a user, for example, as a video within a web browsing environment. In another example, the additional information 704 may be presented as a video within a media player separate from the web browsing environment. A variety of different presentation modes are contemplated as falling within the scope of the claimed subject matter.

Figure 8:
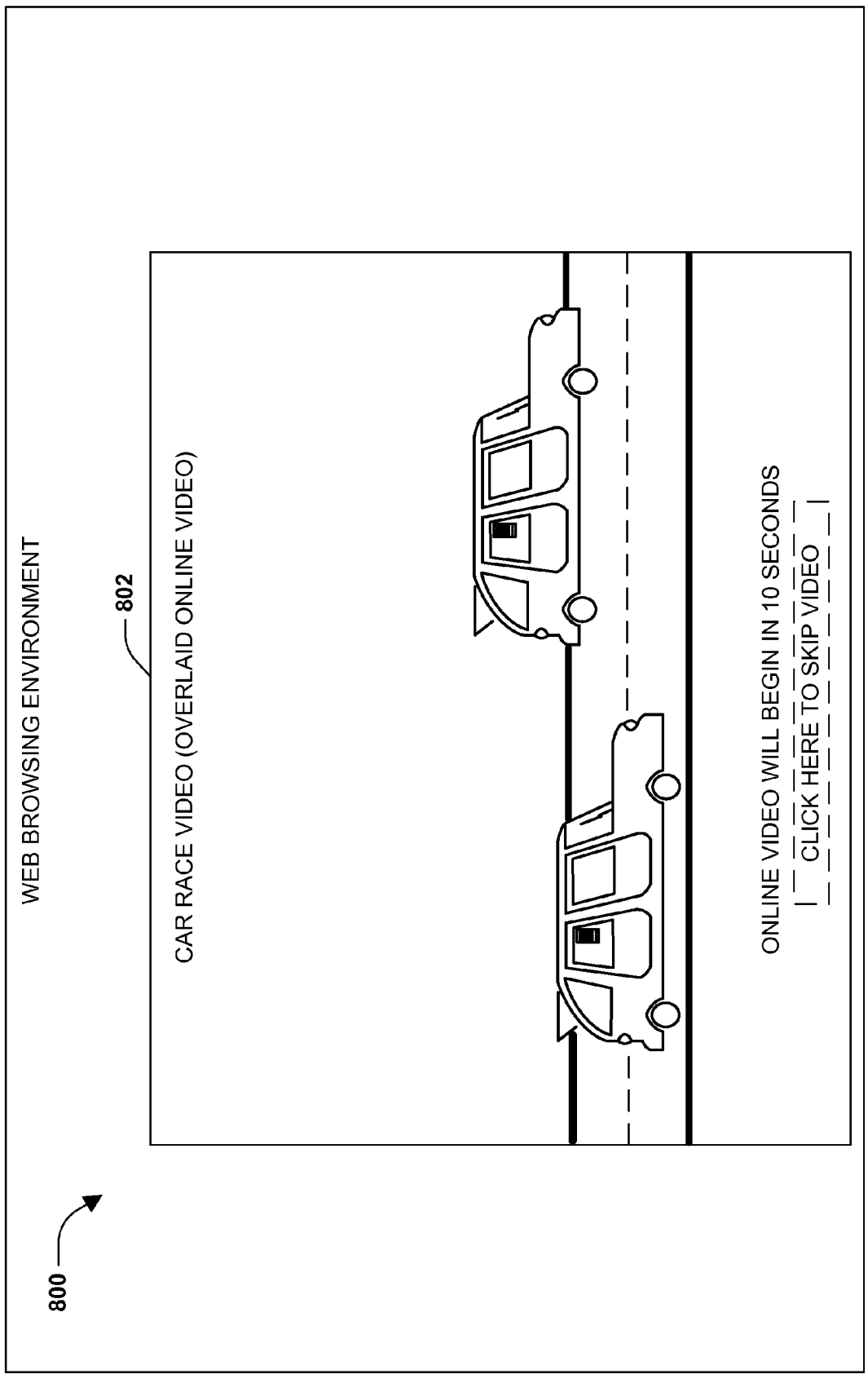
FIG. 8 is an illustration of an example of presenting additional information to a user consuming an online video.

FIG. 8 illustrates an example 800 of presenting additional information 802 to a user consuming an online video. In one example, a set of features relating to cars may have been extracted from the online video. Using the set of features relating to cars, the additional information 802 of a car race video may have been determined. In one example, the additional information 802 of the car race video may be presented overlaid the online video.

Figure 9:
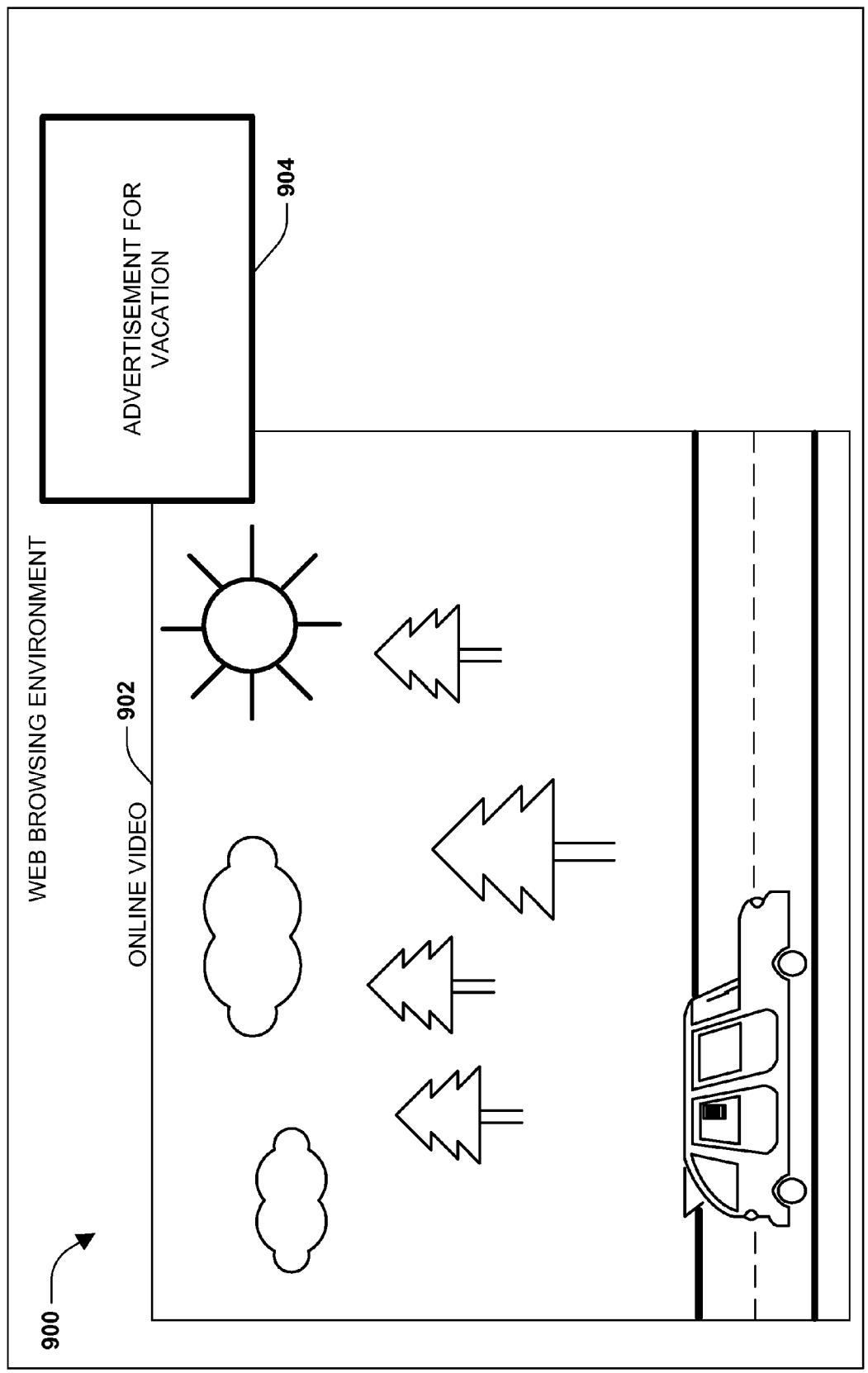
FIG. 9 is an illustration of an example of presenting additional information to a user consuming an online video.

FIG. 9 illustrates an example 900 of presenting additional information 904 to a user consuming an online video 902. In one example, a set of features relating to vacationing may have been extracted from the online video 902. Using the set of features relating to vacationing, the additional information 904 of an advertisement for a vacation (e.g., an image of a vacation coupled with a URL to a website offering deals on vacations) may have been determined. In one example, the additional information 904 of the advertisement for a vacation may be presented to a user consuming the online video 902. In this way, the user's experience is enhanced with rich additional information, which may be gathered from sources outside of the online video 902 host, for example.

Figure 10:
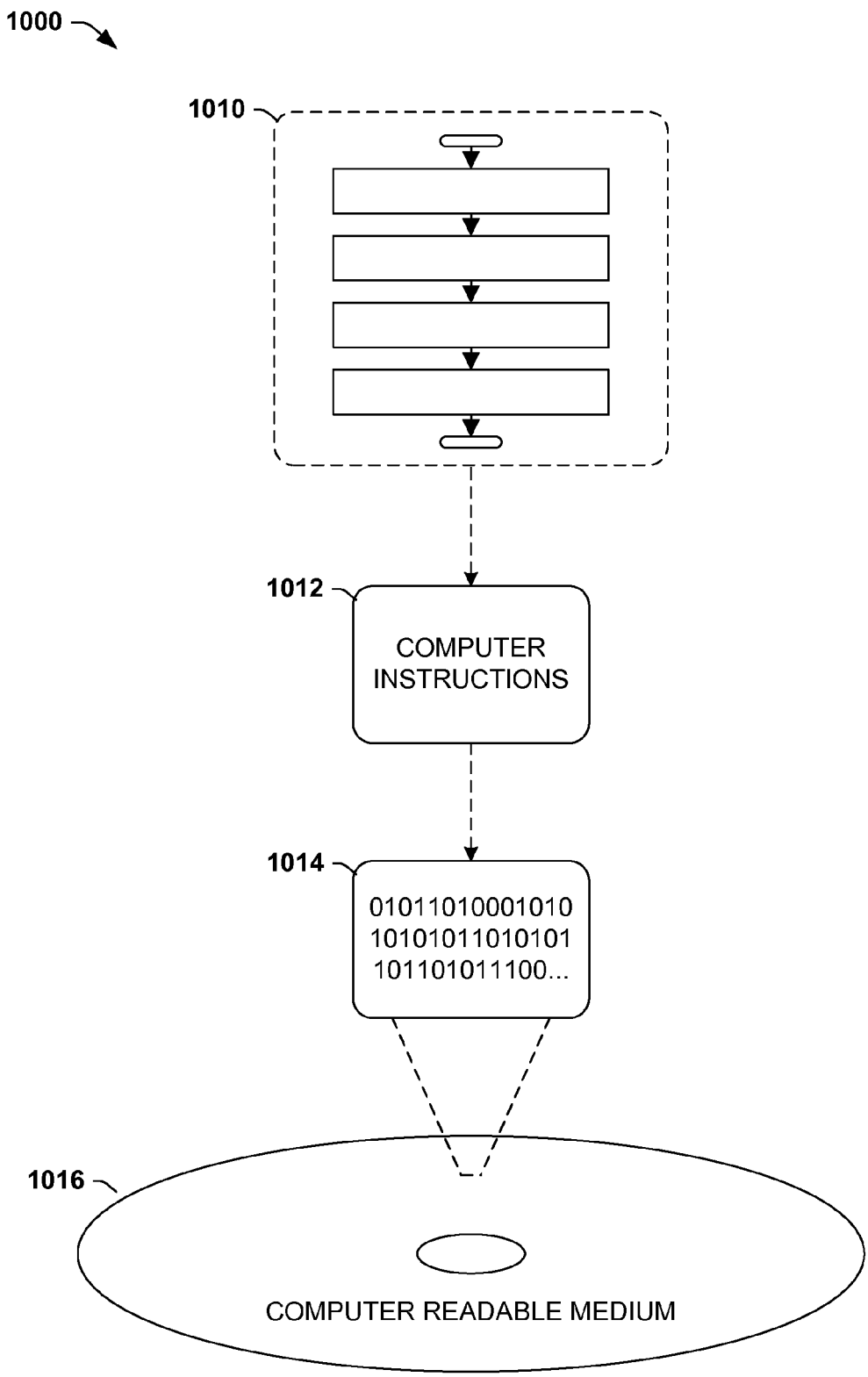
FIG. 10 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 10, wherein the implementation 1000 comprises a computer-readable medium 1016 (e.g., a CD-R, DVD-R, or a platter of a hard disk drive), on which is encoded computer-readable data 1014. This computer-readable data 1014 in turn comprises a set of computer instructions 1012 configured to operate according to one or more of the principles set forth herein. In one such embodiment 1000, the processor-executable computer instructions 1012 may be configured to perform a method 1010, such as the exemplary method 100 of FIG. 1 and exemplary method 200 of FIG. 2, for example. In another such embodiment, the processor-executable instructions 1012 may be configured to implement a system, such as the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 11:
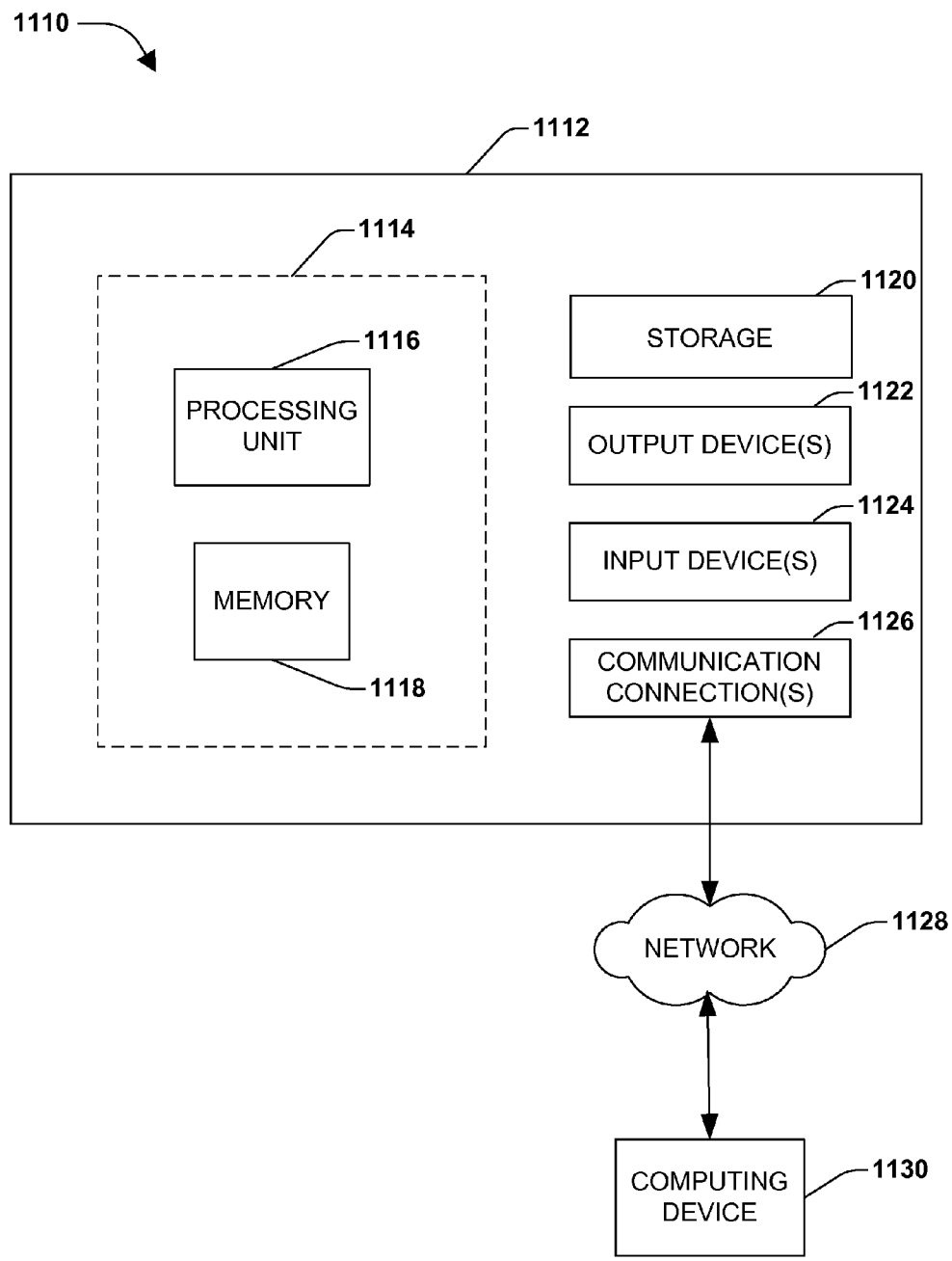
FIG. 11 illustrates an exemplary computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1110 comprising a computing device 1112 configured to implement one or more embodiments provided herein. In one configuration, computing device 1112 includes at least one processing unit 1116 and memory 1118. Depending on the exact configuration and type of computing device, memory 1118 may be volatile (such as RAM, for example), non-volatile (such as ROM, flash memory, etc., for example) or some combination of the two. This configuration is illustrated in FIG. 11 by dashed line 1114.

In other embodiments, device 1112 may include additional features and/or functionality. For example, device 1112 may also include additional storage (e.g., removable and/or non-removable) including, but not limited to, magnetic storage, optical storage, and the like. Such additional storage is illustrated in FIG. 11 by storage 1120. In one embodiment, computer readable instructions to implement one or more embodiments provided herein may be in storage 1120. Storage 1120 may also store other computer readable instructions to implement an operating system, an application program, and the like. Computer readable instructions may be loaded in memory 1118 for execution by processing unit 1116, for example.

The term "computer readable media" as used herein includes computer storage media. Computer storage media includes volatile and nonvolatile, removable and non-removable media implemented in any method or technology for storage of information such as computer readable instructions or other data. Memory 1118 and storage 1120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1112. Any such computer storage media may be part of device 1112.

Device 1112 may also include communication connection(s) 1126 that allows device 1112 to communicate with other devices. Communication connection(s) 1126 may include, but is not limited to, a modem, a Network Interface Card (NIC), an integrated network interface, a radio frequency transmitter/receiver, an infrared port, a USB connection, or other interfaces for connecting computing device 1112 to other computing devices. Communication connection(s) 1126 may include a wired connection or a wireless connection. Communication connection(s) 1126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1112 may include input device(s) 1124 such as keyboard, mouse, pen, voice input device, touch input device, infrared cameras, video input devices, and/or any other input device. Output device(s) 1122 such as one or more displays, speakers, printers, and/or any other output device may also be included in device 1112. Input device(s) 1124 and output device(s) 1122 may be connected to device 1112 via a wired connection, wireless connection, or any combination thereof. In one embodiment, an input device or an output device from another computing device may be used as input device(s) 1124 or output device(s) 1122 for computing device 1112.

Components of computing device 1112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1112 may be interconnected by a network. For example, memory 1118 may be comprised of multiple physical memory units located in different physical locations interconnected by a network.

Those skilled in the art will realize that storage devices utilized to store computer readable instructions may be distributed across a network. For example, a computing device 1130 accessible via a network 1128 may store computer readable instructions to implement one or more embodiments provided herein. Computing device 1112 may access computing device 1130 and download a part or all of the computer readable instructions for execution. Alternatively, computing device 1112 may download pieces of the computer readable instructions, as needed, or some instructions may be executed at computing device 1112 and some at computing device 1130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of identifying digital content relevant to an online video, comprising:
   identifying, by one or more processing units, promotional content embedded within the online video, the promotional content being generated by a first content producer;
   extracting, by the one or more processing units, a feature from the promotional content embedded in the online video, the feature comprising at least one of a textual feature, a visual feature, or an audio feature;
   searching, by the one or more processing units, a database to identify additional information based upon the feature, the additional information being generated by a second content producer different than the first content producer;
   identifying, by the one or more processing units, candidates from the additional information, the candidates including at least two of a textual feature, a visual feature, or an audio feature;
   aggregating, by the one or more processing units, the candidates into an aggregate video; and
   outputting, by the one or more processing units, the aggregate video for presentation.

2. The method of claim 1, wherein outputting the aggregate video for presentation comprises:
   presenting the aggregate video and the promotional content sequentially.

3. The method of claim 1, the visual feature comprising a color histogram.

4. The method of claim 1, the extracting the feature comprising at least one of:
   extracting the textual feature using an OCR text recognition technique; or
   extracting the visual feature using a scale-invariant feature transformation.

5. The method of claim 1, the searching the database to identify the additional information comprising:
   executing a multi modal relevance matching algorithm against the database using the feature to determine the additional information.

6. The method of claim 1, the aggregate video being formatted to be embedded in the online video.

7. The method of claim 1, the extracting the feature comprising:
   parsing the promotional content embedded in the online video into one or more segments, each of the one or more segments comprising a sequence of frames;
   for respective segments, extracting one or more keyframes; and
   extracting the feature from the one or more keyframes of respective segments.

8. The method of claim 7, the extracting one or more keyframes comprising at least one of:
   selecting a middle frame as a keyframe; or
   selecting a frame having a video quality above a threshold as the keyframe.

9. The method of claim 1, wherein the aggregate video comprises advertising information associated with the promotional content embedded within the online video.

10. A system for identifying digital content relevant to an online video, comprising:
    one or more processing units; and
    a memory storing:
       a parsing component configured to, when executed by the one or more processing units:
          select a frame of an online video as a keyframe based upon the frame having a video quality above a threshold;
       a feature extraction component configured to, when executed by the one or more processing units:
          identify promotional content embedded within the keyframe, the promotional content being generated by a first content producer; and
          extract a feature from at least the promotional content embedded within the keyframe, the feature comprising at least one of a textual feature, a visual feature, or an audio feature;
       an information extraction component configured to, when executed by the one or more processing units:
          search a database to identify additional information based upon the feature, the additional information being generated by a second content provider different than the first content producer;
          identify candidates from the additional information determined to be associated with the feature extracted from the promotional content, the candidates including at least two of a textual feature, a visual feature, or an audio feature; and
          in response to identifying the candidates, automatically aggregate the candidates into an aggregate video; and
       a presentation component configured to, when executed by the one or more processing units:
          present the aggregate video.

11. The system of claim 10, the presentation component further configured to:
    present the online video sequentially with the aggregate video.

12. The system of claim 11, the aggregate video being different than the promotional content.

13. The system of claim 10, the parsing component further configured to:
    parse the online video into one or more segments, a segment comprising a sequence of frames; and for respective segments, extract one or more keyframes.

14. The system of claim 10, the information extraction component further configured to:
    execute a multi modal relevance matching algorithm against the database using the feature to determine the additional information.

15. The system of claim 14, the multimodal relevance matching algorithm further configured to:
    perform a text based search algorithm upon the database using the textual feature to determine a first list of candidate additional information;
    perform a visual feature matching algorithm upon the database using the visual feature to determine a second list of candidate additional information; and
    perform a linear combination of the first list and second list to generate a set of additional information.

16. A computer-readable storage device comprising processor-executable instructions that, when executed, cause a computing device to perform a method for identifying digital content relevant to an online video, the method comprising:
    selecting a frame of the online video as a keyframe based upon the frame having a video quality above a threshold;

identifying promotional content embedded within the keyframe, the promotional content being generated by a first content producer;

extracting a feature from at least the promotional content embedded in the keyframe, the feature comprising at least one of a textual feature, a visual feature, or an audio feature;

searching a database to identify additional information based upon the feature, the additional information being generated by a second content producer different than the first content producer;

identifying candidates from the additional information determined to be associated with the feature extracted from the promotional content, the candidates including at least two of a texture feature, a visual feature, or an audio feature;

in response to identifying the candidates, automatically aggregating the candidates into an aggregate video; and outputting the aggregate video for presentation.

17. The computer-readable storage device of claim 16, the method comprising:

presenting the online video sequentially with the aggregate video.

* * * * *